(12) United States Patent
Langworthy et al.

(10) Patent No.: US 7,600,573 B2
(45) Date of Patent: Oct. 13, 2009

(54) TINE HOLDER FOR TURF AERATOR

(75) Inventors: Thomas F. Langworthy, Henderson, MN (US); Walter J. Petersen, Chaska, MN (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 12/008,091

(22) Filed: Jan. 8, 2008

(65) Prior Publication Data

US 2009/0173508 A1 Jul. 9, 2009

(51) Int. Cl.
*A01B 45/00* (2006.01)
(52) U.S. Cl. ........................................................ 172/22
(58) Field of Classification Search ................... 172/21, 172/22, 41, 42, 49.5, 95, 125, 378; 111/118, 111/127, 170; 56/17.1, 17.2; 403/371
See application file for complete search history.

(56) References Cited

U.S. PATENT DOCUMENTS 3,809,166 A * 5/1974 van der Lely et al. ...... 172/49.5

| 4,033,418 A | 7/1977 | Van der Lely |
| 4,574,890 A | 3/1986 | Hansen et al. |
| 4,638,867 A | 1/1987 | Hansen et al. |
| 5,495,895 A * | 3/1996 | Sakamoto ..................... 172/22 |

FOREIGN PATENT DOCUMENTS

EP 1787502 5/2007

* cited by examiner

*Primary Examiner*—Robert E Pezzuto
(74) *Attorney, Agent, or Firm*—James W. Miller

(57) ABSTRACT

A tine holder for holding a plurality of aerator tines has a plurality of substantially vertical, tapered bores. A tapered collar is adapted to be received in each bore with the collar being split so that the collar contracts as the collar is slid into the bore. The upper end of an aerator tine is inserted into each collar before the collar is inserted into the bore such that the contraction of the collar as the collar is thereafter slid into the bore will suffice to tightly grip and hold each tine in the tine holder. A tool is provided for providing enough leverage on the collar to slide the collar over final portions of its movement as the collar slides into the bore during tine installation or to slide the collar over beginning portions of its movement as the collar slides out of the bore during tine removal.

22 Claims, 16 Drawing Sheets

TINE HOLDER FOR TURF AERATOR

TECHNICAL FIELD

This invention relates to a turf aerator for punching aeration holes into the ground to relieve compaction of the turf, to facilitate the entry of air and water into the turf, and to thereby enhance the growth and health of the turf. More particularly, this invention relates to a holder for mounting one or more tines to the aerator for forming aeration holes.

BACKGROUND OF THE INVENTION

It is well known in the turf care industry that the health of the turf can be enhanced by periodically aerating the turf. Aerating the turf involves punching an array of spaced holes into the ground over the area of the turf that is to be aerated. Such aeration holes relieve soil compaction and facilitate the entry of air and water into the turf. This has a beneficial effect on the turf and leads to healthier, more vigorous turf.

Various aerators have been developed for aerating turf areas. One aerator uses a vertically reciprocal array of tines that first punch down into the ground and then are lifted up out of the ground to form the aeration holes as the aerator moves over the turf area. The tines are arranged in groups on different tine holders and are reciprocated up and down out of phase with one another. U.S. Pat. Nos. 6,561,282 and 7,096,969, both owned by The Toro Company, the assignee of this application, disclose aerators with vertically reciprocal tine arrays. Toro also makes and sells aerators of this type as in its Pro-Core 648 aerator among others.

In aerators of this type, the tine holders that carry the tines usually comprise a pair of parts that are clamped together by bolts. Each part of the tine holder has a semi-cylindrical groove that forms one half of a cylindrical bore that will hold an upper end of one of the tines. In installing tines in such a tine holder, the two parts of the holder are separated from one another, the upper ends of the tines are then laid into the semi-cylindrical grooves in a first part of the tine holder, the second part of the tine holder is then overlaid onto the first part with the semi-cylindrical grooves in the second part overlying the other half of the upper ends of the tines, and then the two parts are rigidly bolted together. The tines are tightly clamped within the bores formed by the two parts when the two parts of the tine holder are bolted together.

While effective, this type of tine holder can be difficult and time consuming to take apart in the event one or more tines need to be replaced. It is often the case that only one tine in the group of tines held by the tine holder might be bent or broken or unduly worn, thus requiring replacement, while the other tines are fine. Nonetheless, the entire tine holder must still be disassembled, the tine that needs to be removed must be taken out and replaced with a new tine, and then the entire tine holder must be reassembled. When the tine holder is disassembled, the other tines can easily fall out of the tine holder, thus requiring that they be picked up and reinserted. All of this is made more difficult since the tine holder is often caked or covered with dirt or soil.

Accordingly, there is a need in the aerator art for a tine holder that permits quick and easy replacement of the tines on an individual tine-by-tine basis, yet securely holds the tines during use of the aerator.

SUMMARY OF THE INVENTION

One aspect of this invention relates to a tine holder for use with a turf aerator, the tine holder being driven by the turf aerator in repeating cycles of up and down motion relative to the ground with the tine(s) carried by the tine holder being punched down into the ground during the down part of each cycle to form an aeration hole and with the tine(s) carried by the tine holder being withdrawn from the ground during the up part of each cycle. The tine(s) used with the tine holder have an upper mounting section. The tine holder of this invention comprises a tine holder having a substantially vertically extending bore. A compressible collar is provided for receiving an upper mounting section of one, tine. The compressible collar has an uncompressed state in which the upper mounting section of the tine can be concentrically inserted into the collar and a fully compressed state in which the upper mounting section of the tine is sufficiently tightly gripped by the collar to prevent removal of the tine from the collar under the forces encountered by the tine and the collar during operation of the aerator. The bore is shaped to compress the collar from the uncompressed state to the fully compressed state as the collar with the tine held therein is slid into the bore in a tine installation operation. A pivotal lever is operatively engaged with both the tine holder and with the collar holding the tine for applying leverage to the collar to force the collar further into the bore to at least finish moving the collar to the fully compressed state within the bore to thereby complete the tine installation operation.

Another aspect of this invention relates to a tine holder for use with a turf aerator, the tine holder being driven by the turf aerator in repeating cycles of up and down motion relative to the ground with the tine(s) carried by the tine holder being punched down into the ground during the down part of each cycle to form an aeration hole and with the tine(s) carried by the tine holder being withdrawn from the ground during the up part of each cycle. The tine(s) used with the tine holder have an upper mounting section. The tine holder of this invention comprises a tine holder having a plurality of spaced vertical bores therein for holding a plurality of generally upright spaced tines in a side-by-side manner. A plurality of radially compressible members corresponding in number to the numbers of bores is provided with one compressible member being provided for each bore. The compressible members radially expand when the compressible members are uncompressed and radially contract when the compressible members are compressed. Each compressible member when uncompressed is radially large enough to allow the upper mounting section of the tine to be inserted concentrically within the compressible member and each compressible member when compressed is radially small enough to allow the upper mounting section of the tine to be tightly gripped within the compressible member and to avoid coming out of the compressible member during operation of the aerator. Each compressible member can be compressed and uncompressed separately from the other compressible members in the tine holder to allow an individual tine to be removed from and replaced in the tine holder without affecting the gripping force provided by the other compressible members on the other tines.

Yet another aspect of this invention relates to a tine holder for holding a plurality of aerator tines. The tine holder has a plurality of substantially vertical, tapered bores. Tapered collars are provided with one collar adapted to be received in each bore. Each collar is split so that the collar contracts as the collar is slid into the corresponding bore. The upper end of an aerator tine is inserted into each collar such that the contraction of the collar as the collar is slid into the bore will suffice to tightly grip and hold each tine in the tine holder. A tool is provided for applying leverage to the collar to physically slide the collar in a first direction over final portions of its movement as the collar slides into the bore during tine installation and to physically slide the collar in a second opposed direction over beginning portions of its movement as the collar slides out of the bore during tine removal.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Figure 1:
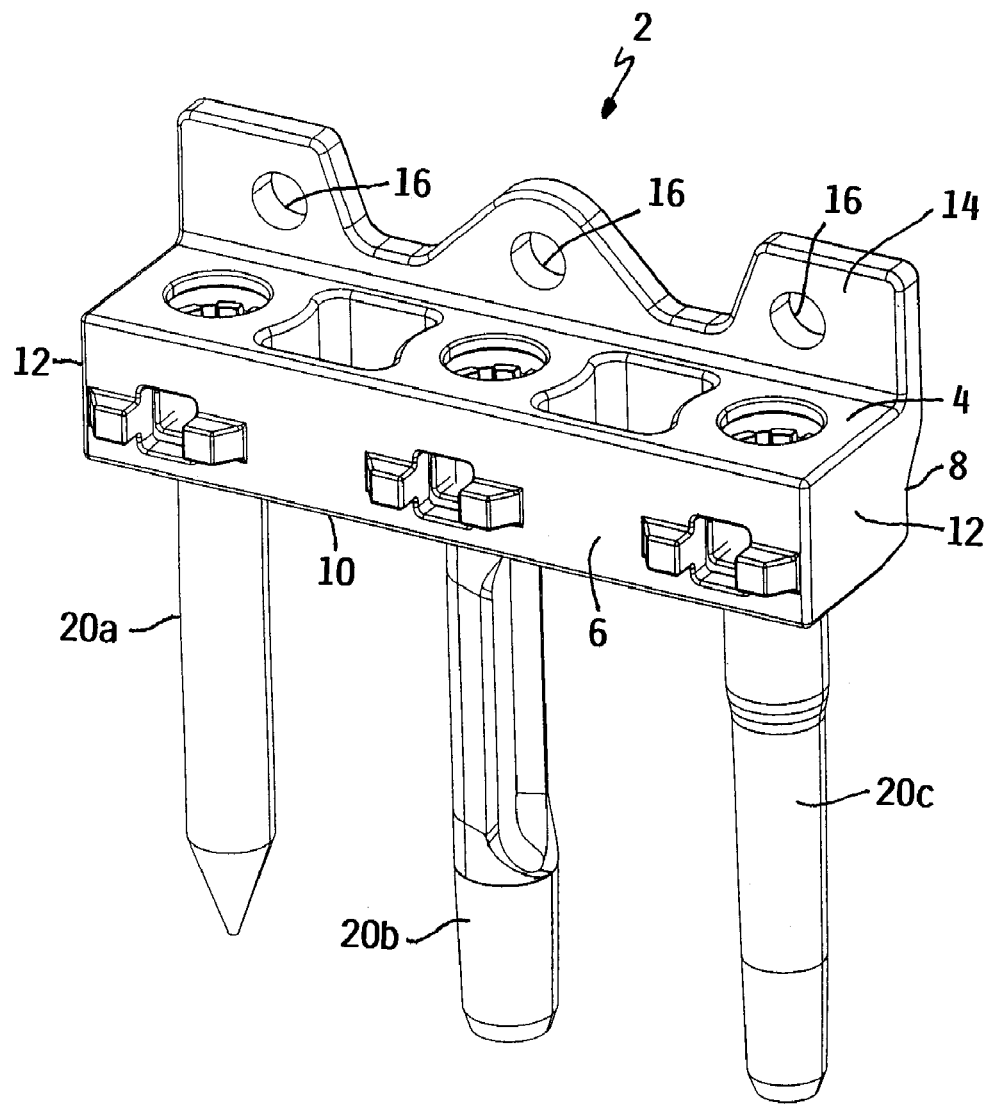
FIG. 1 is a perspective view of a tine holder according to this invention, particularly illustrating three different tines, namely a solid tine, a side eject tine, and a top eject tine, being carried or mounted in the tine holder for use on a turf aerator when the tine holder is mounted on the turf aerator.

Referring to FIG. 1, a tine holder according to this invention is generally illustrated as 2. Tine holder 2 comprises a generally rectangular body having a top face 4, a front face 6, a back face 8, a bottom face 10, and a pair of opposed side faces 12. A vertical flange 14 extends upwardly from the back of top face 4 and includes a plurality of mounting holes 16. Bolts (not shown) may extend through mounting holes 16 to bolt tine holder 2 to a drive linkage (not shown) on the turf aerator (not shown) which uses tine holder 2. As the drive linkage reciprocates up and down during the operation of the aerator, tine holder 2 will similarly move up and down to first punch the aeration tines 20 carried by tine holder 2 into the ground and to then lift the aeration tines 20 carried by tine holder 2 out of the ground. The turf aerator to which tine holder 2 is mounted can be of the type further disclosed in the assignee's U.S. Pat. No. 7,096,969, which is hereby incorporated by reference.

As shown in FIG. 1, tine holder 2 carries or mounts three aeration tines 20 in a side-by-side manner. Thus, as tine holder 2 is vertically reciprocated up and down, each cycle of operation will create three laterally spaced aeration holes in the ground. Typically, the aerator will mount a plurality of side-by-side tine holders thereon and will vertically reciprocate tine holders 2 up and down out of phase with one another. Thus, for example, if an aerator mounts six tine holders to six different drive linkages and if each tine holder mounts or carries three aeration tines 20, then each up and down cycle of reciprocating motion of the aerator will create eighteen aeration holes across the width of the swath of holes being formed in that pass of the aerator. The number of tine holders 2 mounted to an aerator, and the number of tines 20 mounted or carried on each tine holder, can obviously vary.

Tine holder 2 of this invention is adapted to mount different types of aerator tines 20, including the three major types of tines. These types comprise a solid tine 20a with a pointed lower section that simply punches an aeration hole into the ground, a hollow side eject tine 20b for forming an aeration core in the interior of tine 20 and for ejecting the aeration core through a side eject exit formed by a slot 22, and a hollow top eject tine 20c with an open upper end or top exit in which the aeration core formed in the interior of tine 20 is eventually ejected through the top of tine 20c. The side eject tine 20b is often mounted with the side exit facing to a rear side of tine holder 2 rather than to a right side of tine holder 2 as shown in the drawings. Side eject tine 20b is not restricted for use in tine holder 2 with the side exit facing in any particular direction. Usually, the same tine 20, whether it is a solid tine 20a, a side eject tine 20b, or a top eject tine 20c, will be used on a given tine holder 2, and on all tine 20 holders 2 on a given aerator, at the same time. The types of tines 20 in use will not typically be mixed as shown in FIG. 1, which illustrates different tines simply to show that tine holder 2 may be used with the aforementioned solid 20a, side eject 20b, and top eject 20c tines.

Figure 2:
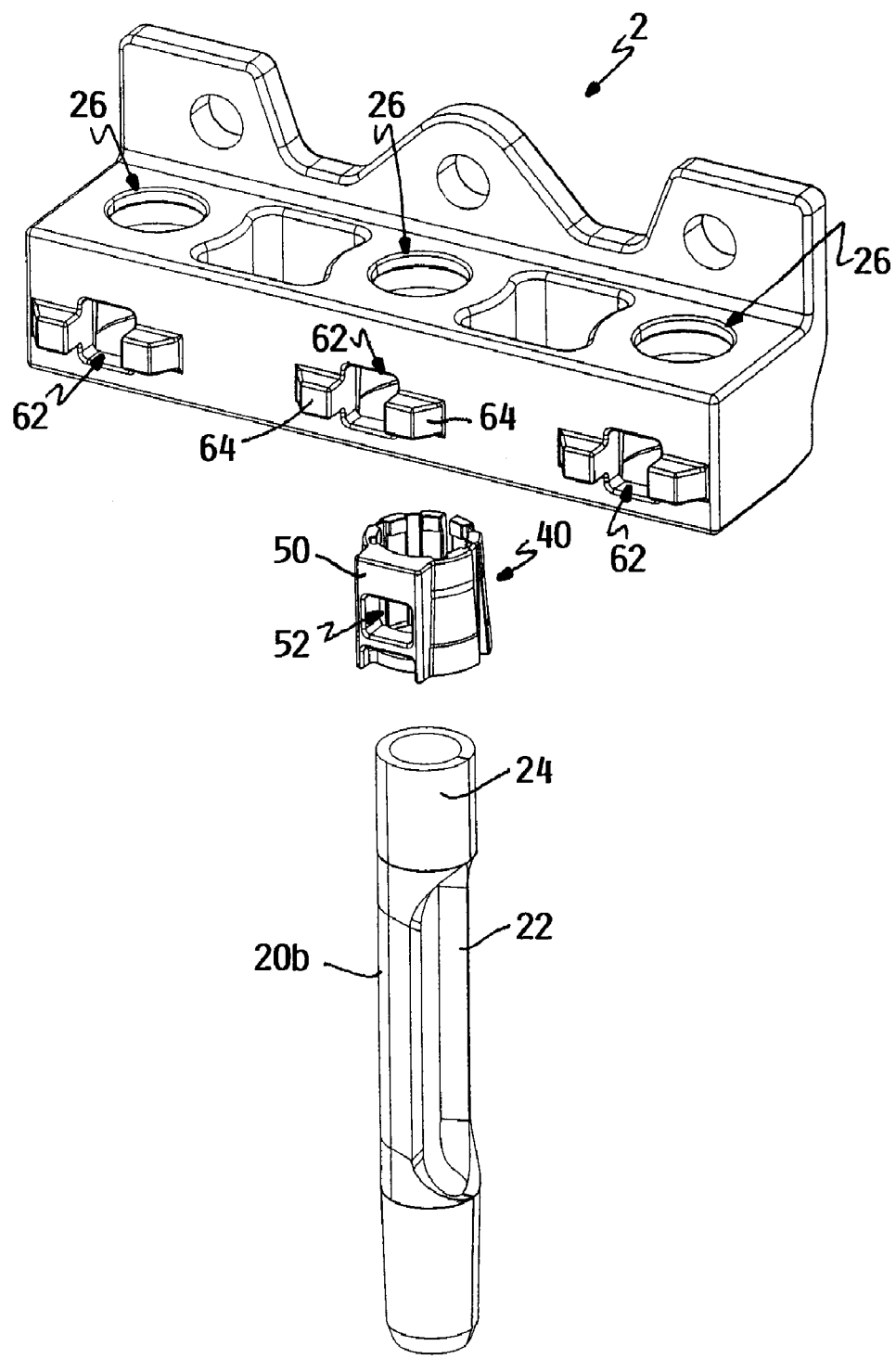
FIG. 2 is a perspective view similar to FIG. 1, but with the solid and top eject tines having been removed for the purpose of clarity and with the side eject tine and its carrying collar having been exploded downwardly out of their corresponding bore in the tine holder.

Tine holder 2 has identical structure for mounting each tine 20 that it carries, so a description of the structure for one tine 20 will suffice to describe the identical structure for the other tines 20. In this regard, FIG. 2 will illustrate the tine mounting structure for only the middle side eject tine 20b that had been shown in FIG. 1, the other two tines 20a and 20c having been removed from FIG. 2 for the purpose of clarity. The other two tines 20a and 20c will be mounted identically in tine holder 2 using identical mounting structure. This mounting structure is designed to firmly but releasably grip a cylindrical upper mounting section 24 of each tine 20.

The tine mounting structure in tine holder 2 for each tine comprises a vertical passageway or bore 26 having an open bottom mouth 28 in bottom face 10 of tine holder 2. Bore 26 extends through the height of tine holder 2 to an open upper end 30 in top face 4 of tine holder 2. The reason for extending bore 26 all the way through the height of tine holder 2 is to allow the cores being ejected by a top eject tine 20c to pass up through the open upper end of the top eject tine and from there out through the open upper end 30 of bore 26 in tine holder 2. If tine holder 2 were designed to be used only with solid tines 20a or side eject tines 20b, then bore 26 provided therein would not have to extend all the way through the height of tine holder 2. The upper end 30 of bore 26 could be closed in that event.

Figure 3:
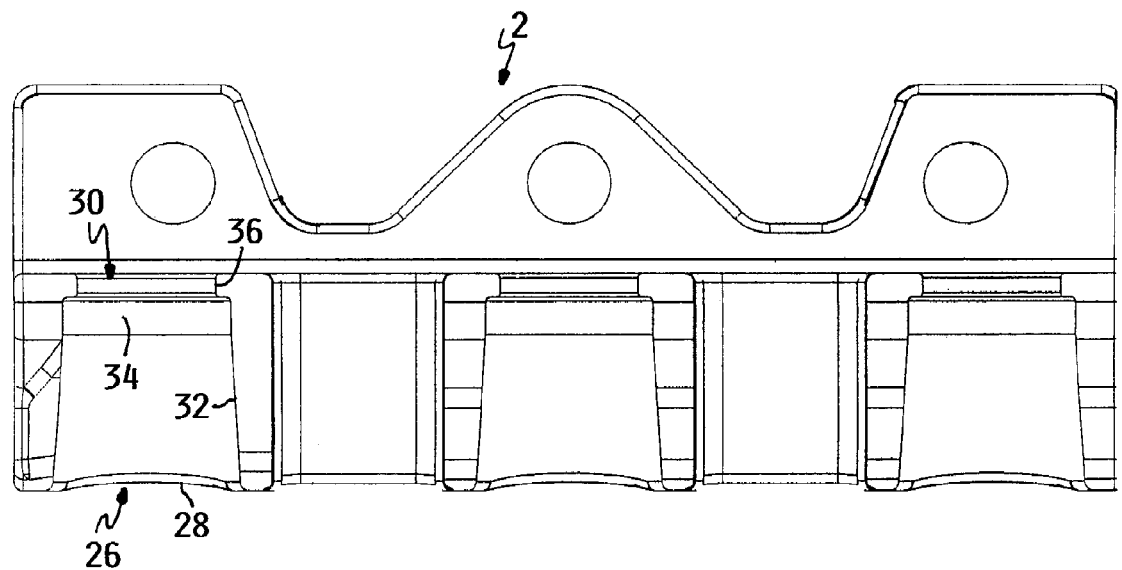
FIG. 3 is a cross-sectional, side elevational view of the tine holder, collar and side eject tine as shown in FIG. 2.
Figure 3:
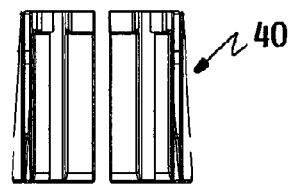
Figure 3:
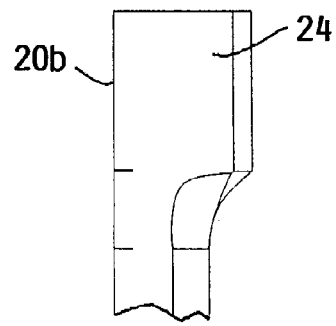

Referring now to FIG. 3, each bore 26 in tine holder 2 has a first portion 32 with a truncated conical shape with the first portion 32 of bore 26 narrowing or tapering inwardly as bore 26 extends upwardly from open bottom mouth 28 thereof. In other words, the diameter of bore 26 is widest at open bottom mouth 28 thereof and then the diameter progressively and slightly decreases as bore 26 extends upwardly over the length of the first portion 32 of bore 26. Bore 26 then has a shorter second portion 34 of constant diameter atop the first truncated conical portion 32 of bore 26. A third reduced diameter portion 36 forms the upper end 30 of bore 26, which third portion may be closed off if tine holder 2 is not designed for top eject tines 20c as described earlier herein.

Figure 4:
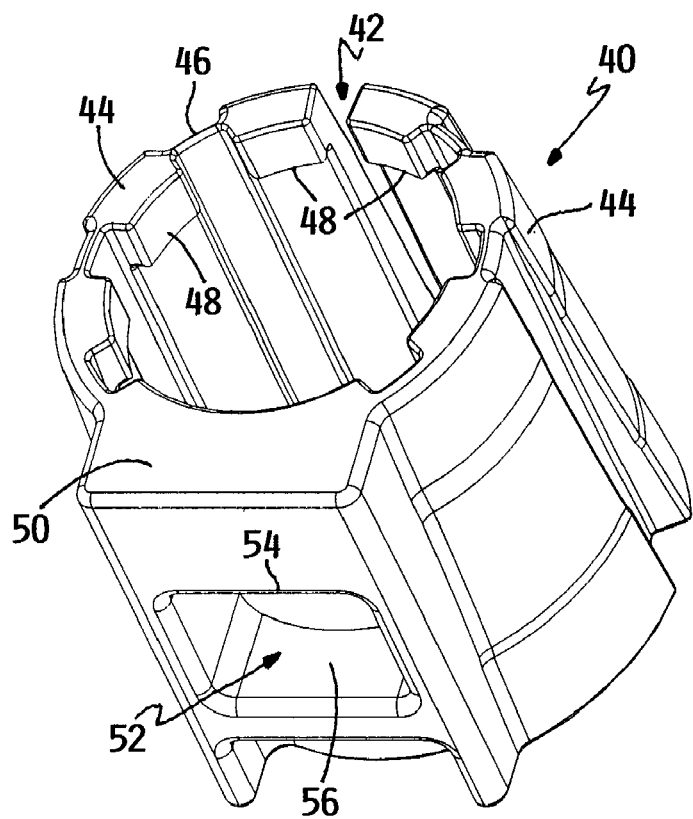
FIG. 4 is a perspective view of one of the tine carrying collars used in the tine holder of FIG. 1.
Figure 5:
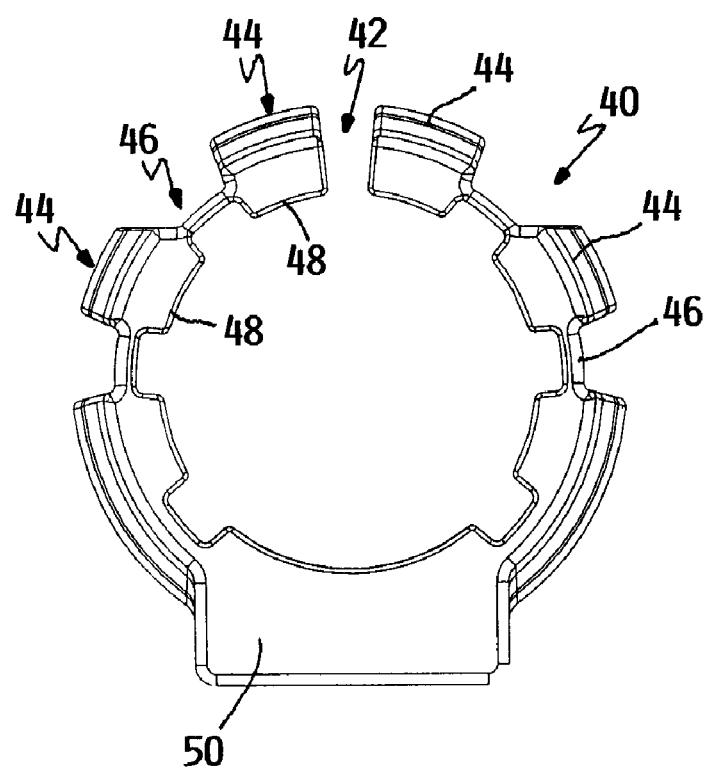
FIG. 5 is a top plan view of the tine carrying collar shown in FIG. 4.
Figure 6:
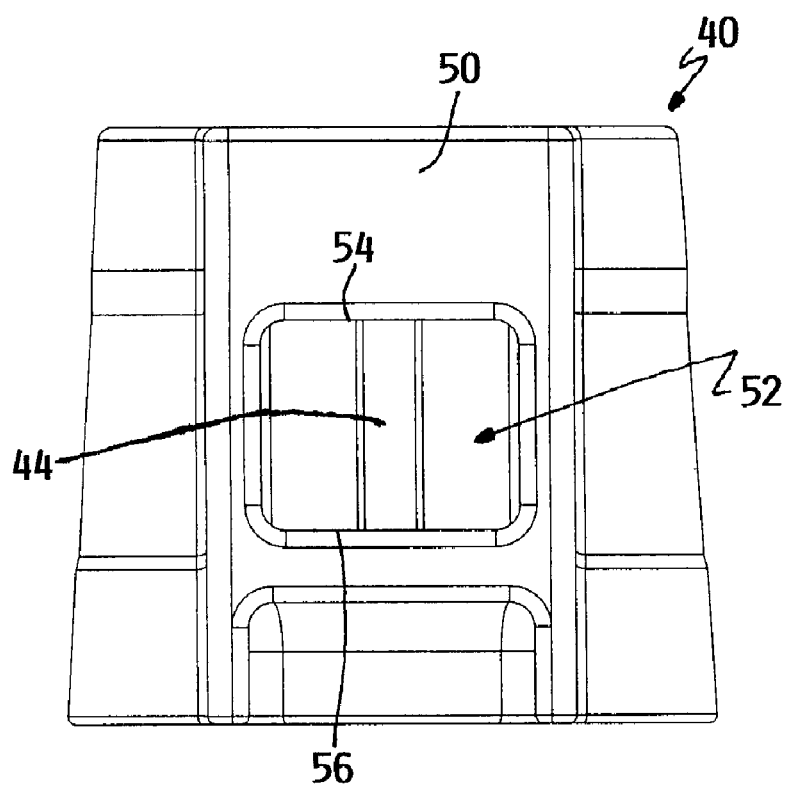
FIG. 6 is a front elevational view of the tine carrying collar shown in FIG. 4.

Bore 26 is designed to coact with and collapse or compress a split collar 40 into which the cylindrical mounting section 24 of tine 20 is inserted as collar 40 and its inserted tine are pushed up into bore 26 through open bottom mouth 28 thereof. The details of collar 40 are best shown in FIGS. 4-6.

Collar 40 is generally cylindrical and extends substantially 360° around in a circle except for a split or gap 42 along one side thereof. Collar 40 does not have a uniform thickness, but preferably comprises a plurality of circumferentially spaced ribs or lands 44 that are relatively thick. Lands 44 are separated by spaced grooves 46 comprised of a wall section that is much thinner than the thickness of the adjacent lands. The presence of split 42 along one side of collar 40 along with the thinner wall sections of grooves 46 make collar 40 compressible under reasonable amounts of force, i.e. collar 40 can be radially squeezed together to radially compress or narrow the inner diameter thereof with the kind of force that can be relatively easily applied using lever 60 as described hereafter.

The inner diameter of collar 40 is defined by the distance between opposed lands of collar 40. The inside surfaces of lands 44 extend vertically and are parallel to one another to form a generally cylindrical surface. The inner diameter of this generally cylindrical surface is what changes when collar 40 is compressed. When collar 40 is compressed, the inside surfaces of lands 44 move closer to one another. The upper cylindrical mounting section 24 of tine 20 is inserted up into the inner diameter of collar 40 until the top end of tine 20 abuts against upper overhanging shoulders 48 provided at the tops of lands 44. This insertion is done when collar 40 is uncompressed since the inner diameter of collar 40 will in that event be slightly larger than the outer diameter of the upper cylindrical mounting section 24 of tine 20.

The outside surface of collar 40 is defined generally by the shape of the outside surfaces of lands 44. As shown in FIG. 5, the outside surface of collar 40 also has a truncated, slightly conical shape decreasing in diameter as lands 44 extend vertically upwardly. As mentioned earlier, this shape is designed to allow collar 40 to be inserted into bore 26. As collar 40 is fully inserted into bore 26, the shape of bore 26 will then begin to act on the outside surface of collar 40 to compress collar 40 ever more tightly onto the top of tine 20. When collar 40 is fully received within bore 26, the gripping force provided by collar 40 will be sufficiently tight to firmly grip and hold tine 20 within tine holder 2 during operation of the aerator, namely while tine 20 is first driven down into the ground and then extracted from the ground in a repetitive manner.

Collar 40 includes a thickened protruding key 50 containing a tool receiving seat formed by a window 52. Key 50 is located along the side of collar 40 that is opposite to the side having the split or gap 42 therein. Lands 44 and grooves 46 are absent over key 50 of collar 40. Key 50 on collar 40 will be received in a mating keyway (not shown) in one side of bore 26 to help locate collar 40 within bore 26 and to prevent relative rotation between collar 30 and bore 26 but to permit up and down sliding motion between the two. Window 52 in the side of collar 40 has a top 54 that forms an upper thrust surface and a bottom 56 that forms a lower thrust surface.

Figure 7:
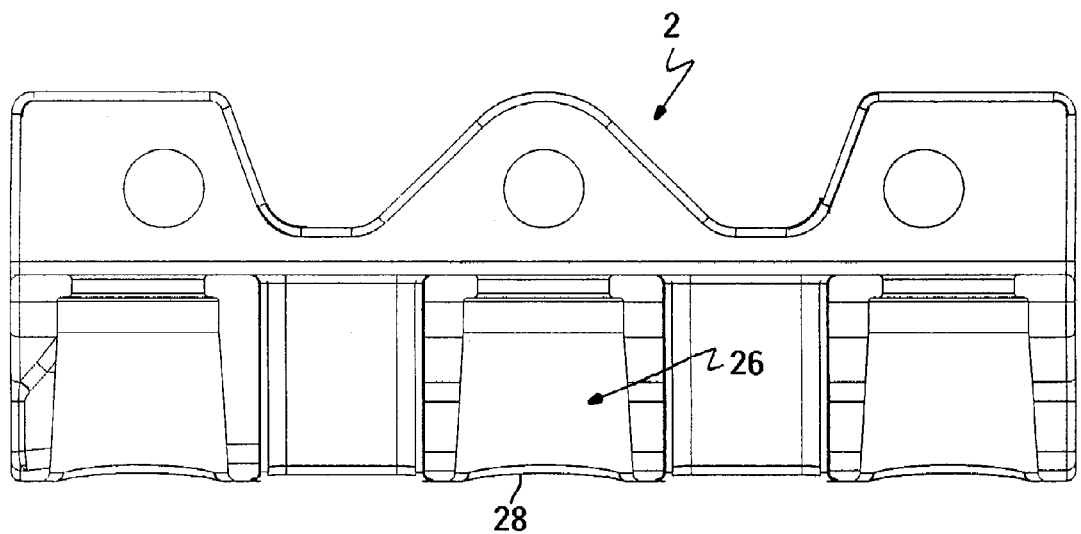
FIG. 7 is a cross-sectional, side elevational view similar to FIG. 3 illustrating a portion of the process for installing the tine in the tine holder, namely the step of sliding the upper mounting section of the tine into the collar.
Figure 7:
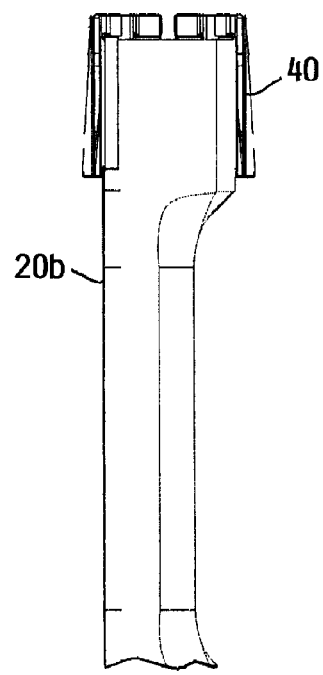

The operation of installing tine 20 in tine holder 2 will now be described. Referring first to FIG. 7, tine 20 is first pushed up into or inserted into collar 40. In this regard, the upper cylindrical mounting section 24 is simply pushed up into the inner diameter of collar 40 until the top of tine 20 abuts against the overhanging shoulders 48 at the top ends of lands 44. This is done when collar 40 is not compressed tightly within bore 26 of tine holder 2. This allows the user to simply push tine 20 by hand into tine holder 2 with there being simply a loose or slight interference fit between the two.

Figure 8:
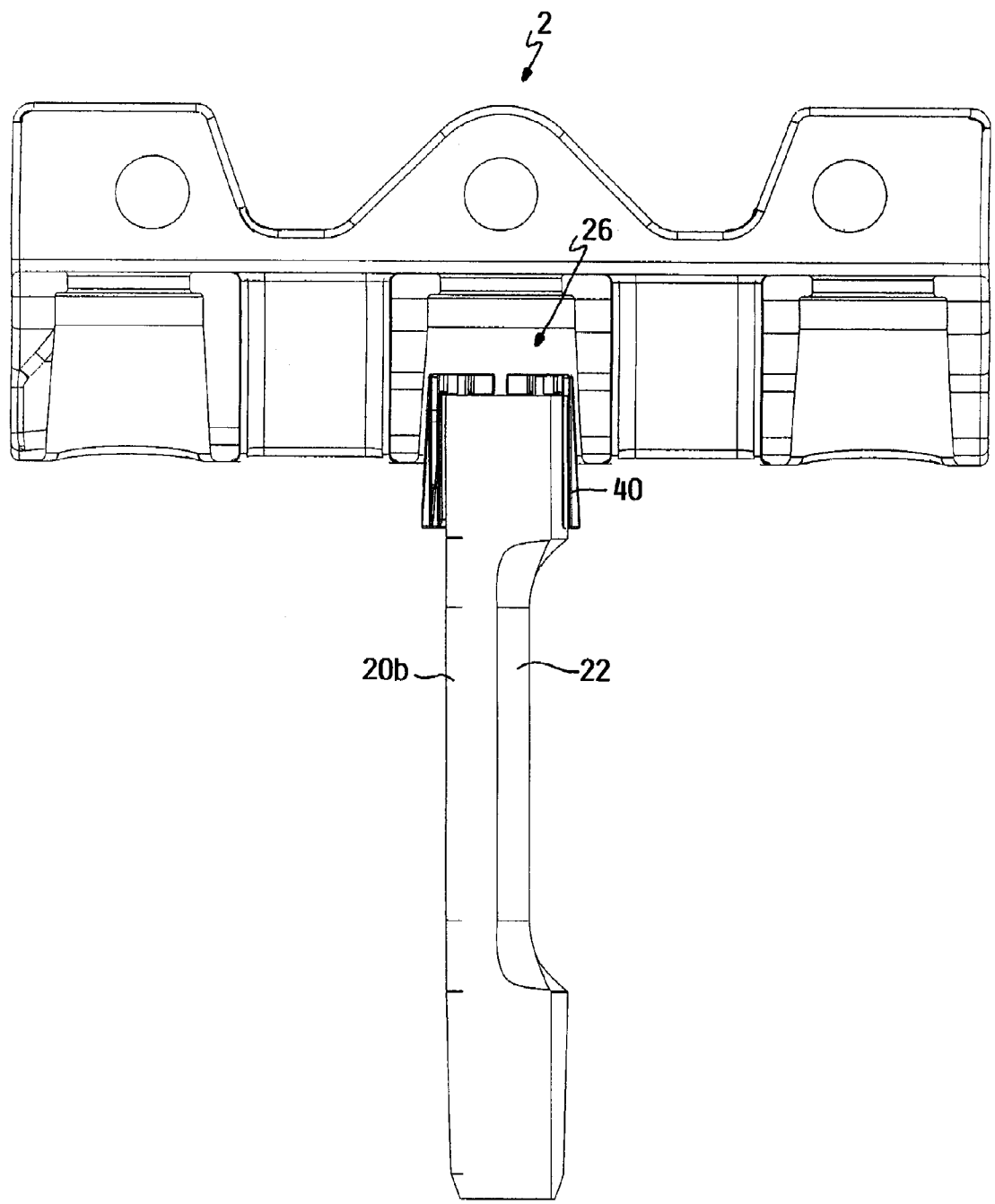
FIG. 8 is a cross-sectional, side elevation view similar to FIG. 7, particularly illustrating another portion of the process for installing the tine in the tine holder, namely the step of sliding the collar and the tine carried thereby partially up into the corresponding bore provided therefor in the tine holder.

After tine 20 is inserted into collar 40, the next step is to push collar 40 up into open bottom mouth 28 of bore 26 in tine holder 2. The user can do this simply by holding onto tine 20 itself and lifting up on tine 20 while key 50 on collar 40 is aligned with the mating keyway of bore 26. As collar 40 moves up into bore 26, partial insertion of collar 40 is permitted before bore 26 starts to begin tightly gripping collar 40. Thus, the user can push collar 40 up at least partially into bore 26, again by hand, before sufficient resistance is felt that prevents continued easy insertion by hand. At this point of partial insertion, collar 40 will be partially compressed around tine 20 and both collar 40 and tine 20 will be gripped tightly enough that they will not fall out of bore 26 and tightly enough that it is difficult or impossible to advance them further into bore 26 using simply hand pressure. However, at this point of partial insertion and partial compression of collar 40, collar 40 and tine 20 are still far from being fully inserted. If the aerator were operated with collar 40 and tine 20 only partially inserted as shown in FIG. 8, collar 40 and tine 20 would simply fly or drop out of bore 26 from the forces encountered thereon during operation.

To completely insert collar 40 and tine 20 into bore 26, the user must use a lever 60 provided with tine holder 2 of this invention to provide additional upward leverage on collar 40. Referring first to FIG. 1, front face 6 of tine holder 2 is provided with an aperture 62 similar to window 52 in collar 40. Two fulcrum blocks 64 are provided with one fulcrum block 64 being placed adjacent either side of aperture 62 to define a fulcrum that acts in concert with lever 60. Since tine holder 2 shown in FIG. 1 includes three collars 40 for holding three tines 20, there are three apertures 62 and three pairs of fulcrum blocks 64 provided on front face 6 of tine holder 2, one aperture 62 and one pair of fulcrum blocks 64 for each tine.

Figure 9:
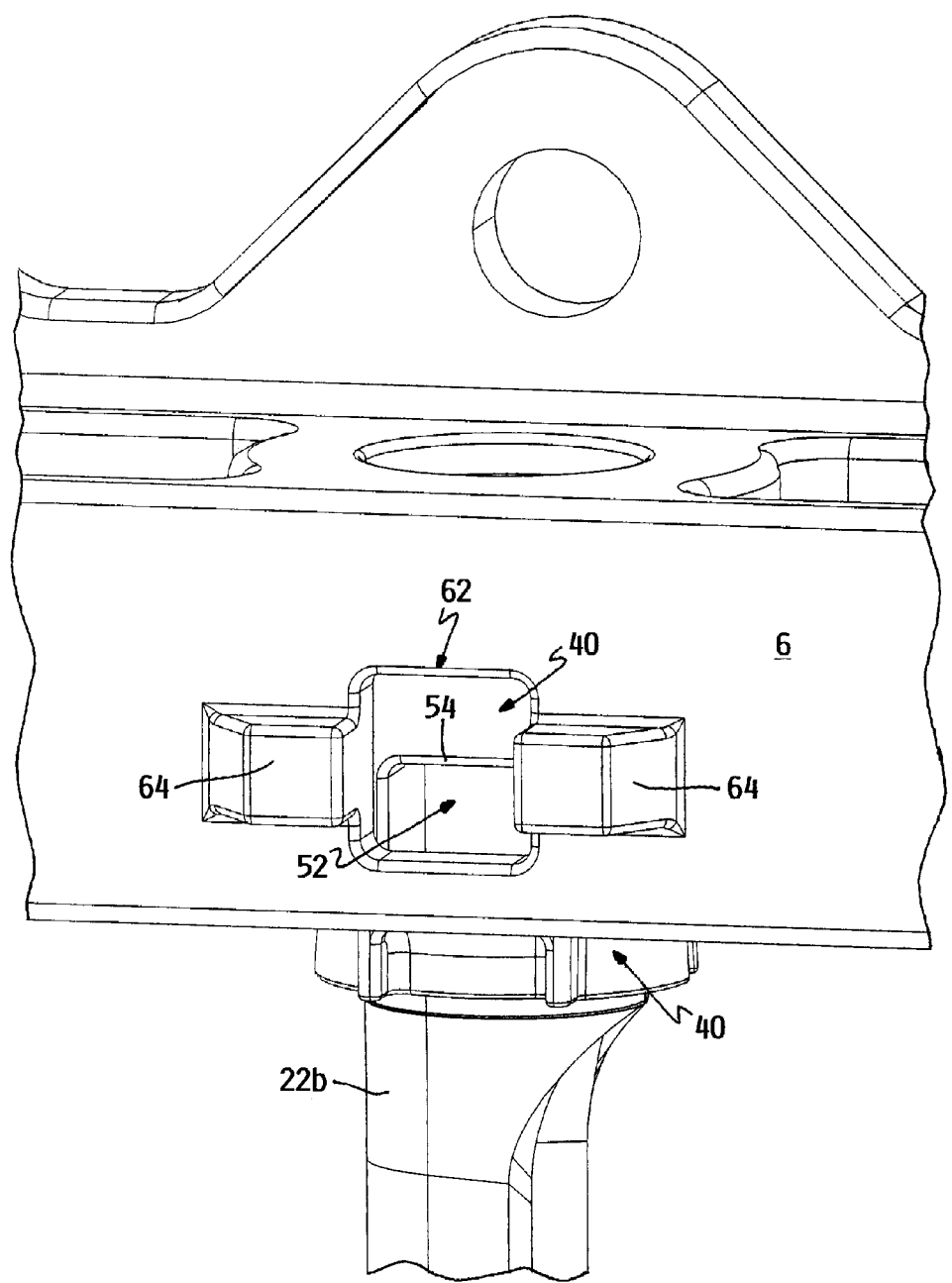
FIG. 9 is a perspective view of a portion of the front face of the tine holder of FIG. 1, particularly illustrating the partially inserted collar and tine in the bore as shown in FIG. 8 to show that the window in the collar straddles the aperture in the tine holder.

Referring now to FIGS. 9-12, when collar 40 and tine 20 carried by collar 40 are partially inserted into bore 26, window 52 in collar 40 will straddle aperture 62 in tine holder 2 as shown in FIG. 9. The upper thrust surface formed by the top 54 of window 52 in collar 40 will be above the bottom of aperture 62 in tine holder 2 so that the upper half or so of window 52 in collar 40 will be exposed through aperture 62 in tine holder 2. A first end of elongated lever 60 is formed with a first curved cam 70 that is adapted to be inserted through aperture 62 in tine holder 2 with first cam 70 being able to get under the top of window 52 in collar 40. The first end of lever 60 also has a plurality of bearing surfaces 72 with one bearing surface 72 being adjacent either side of first cam 70. Bearing surfaces 72 engage or abut with the top sides of fulcrum blocks 64 when the first end of lever 60 is inserted as described above.

Figure 10:
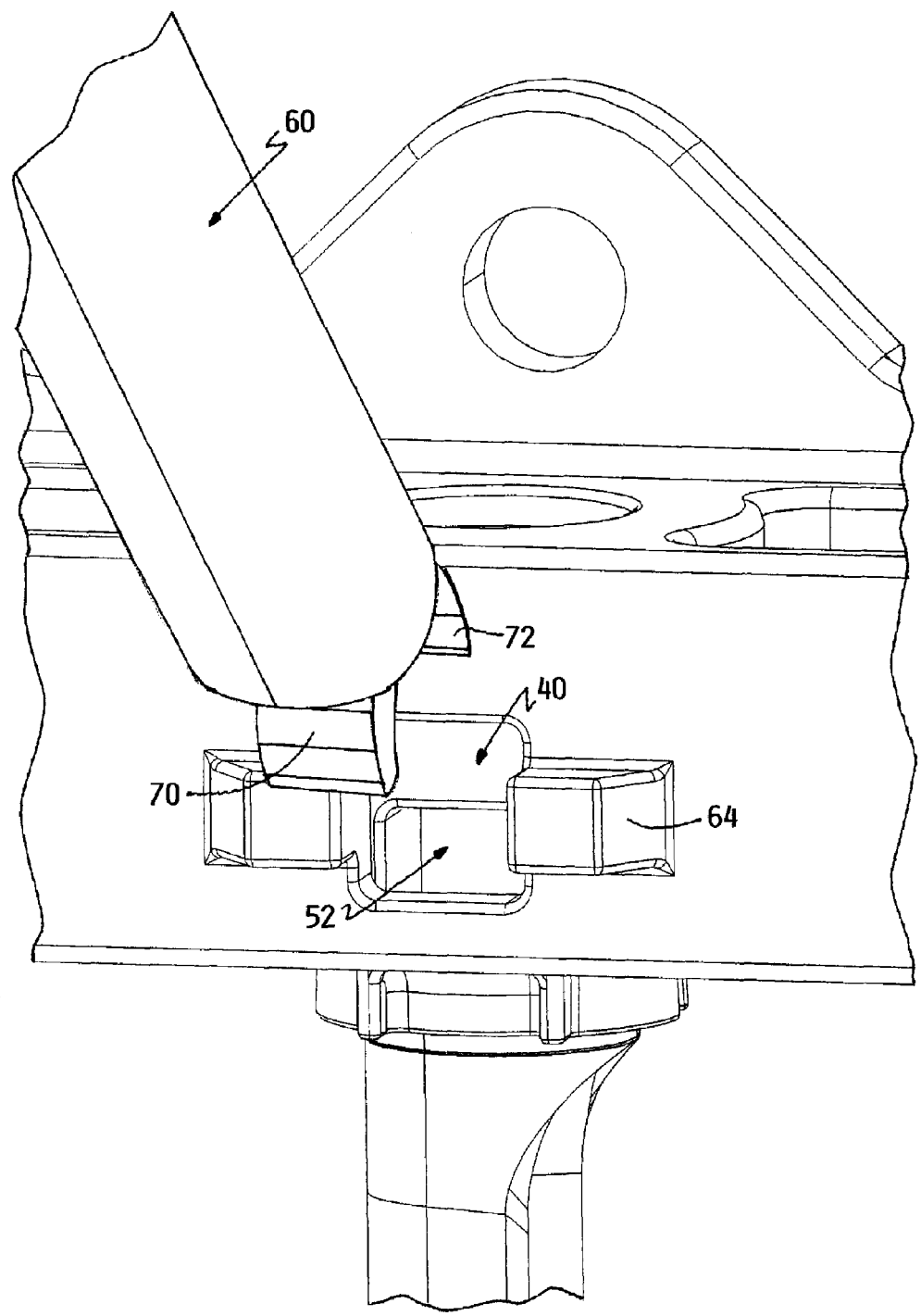
FIG. 10 is a perspective view similar to FIG. 9, particularly illustrating a first end of a lever approaching the tine holder and the partially inserted collar
Figure 11:
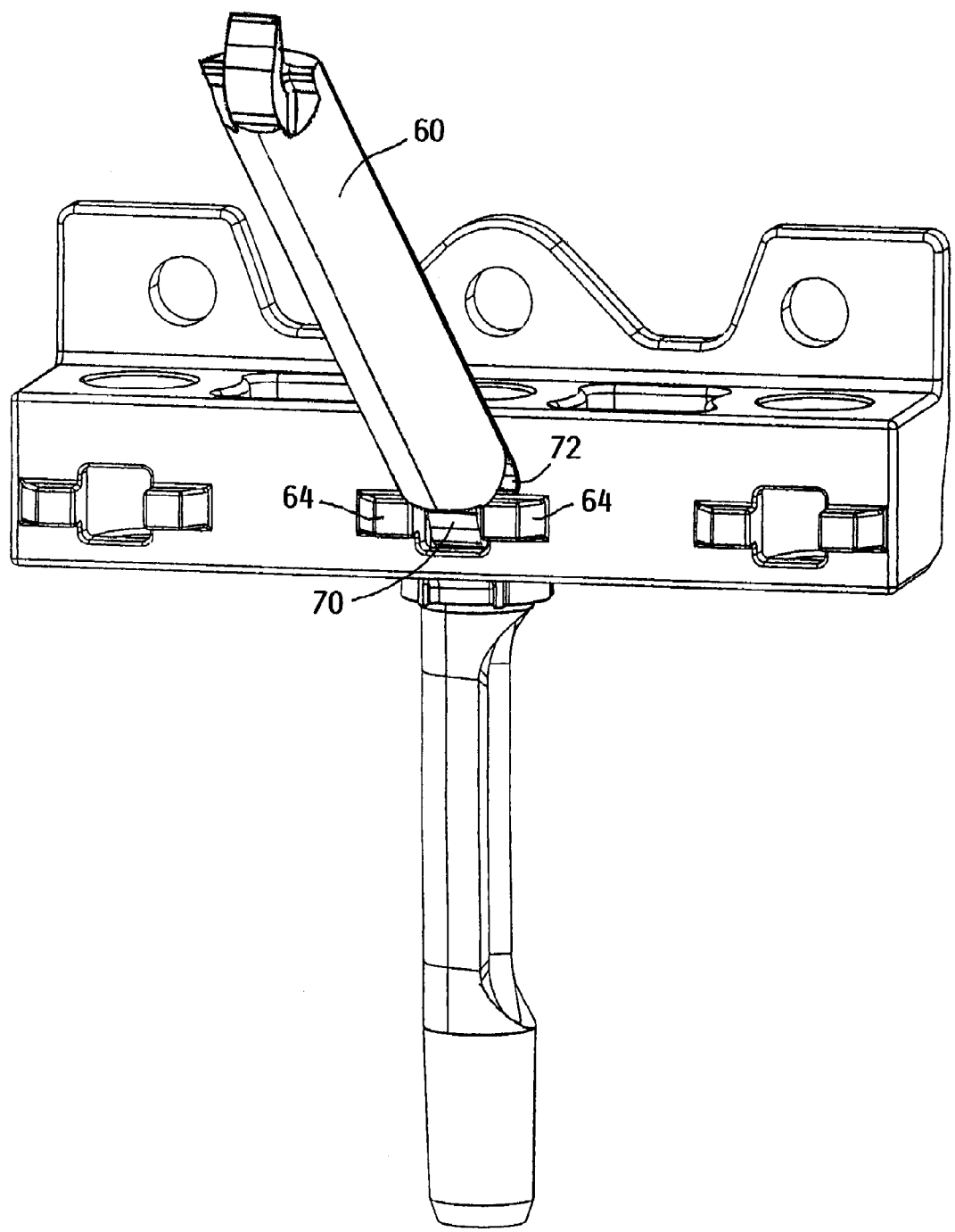
FIG. 11 is a perspective view similar to FIG. 10, but showing the first end of a lever fully engaged with the tine holder.

FIG. 10 shows the first end of lever 60 approaching window 52 in tine holder 2 and collar 40, but with the first end of lever 60 not yet engaged with either. FIG. 11 shows the first end of lever 60 having engaged tine holder 2 with first cam 70 having been at least partially inserted or jammed beneath the top of window 52 in collar 40 and with the bearing surfaces 72 on the first end of lever 60 having been abutted against the top sides of fulcrum blocks 64.

Figure 12:
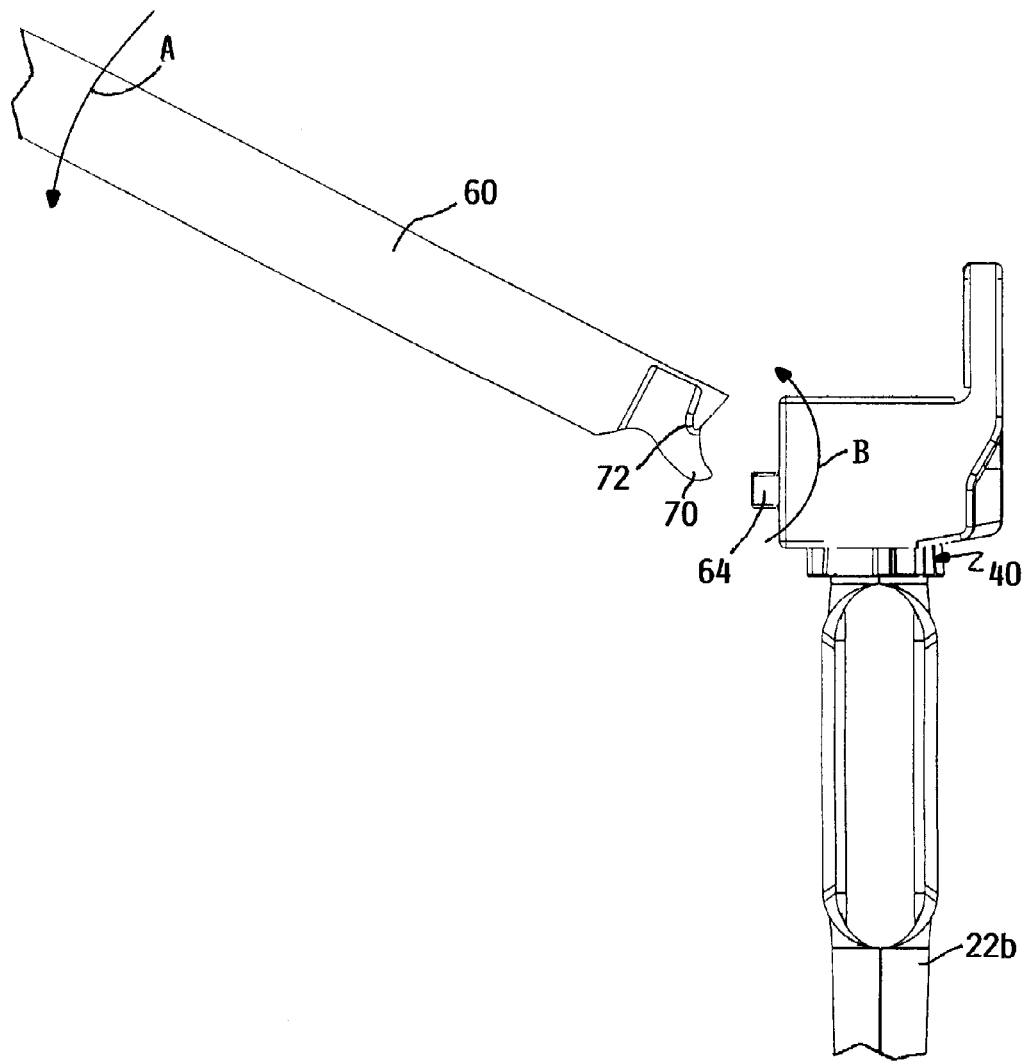
FIG. 12 is a side elevational view of the tine holder and the lever corresponding to the depiction in FIG. 10, particularly illustrating the curved first cam on the first end of the lever and how the first cam will pivot upwardly as the lever is rotated downwardly from the position shown in FIG. 12 about the fulcrum provided on the front face of the tine holder.

With lever 60 inserted into tine holder 2 as described above and with lever 60 inclined downwardly, the user can complete the tine installation operation on the partially inserted collar and tine by pushing downwardly on the second end of lever 60 as indicated by the arrow A in FIG. 12. When this occurs, the first end of lever 60 will pivot about the fulcrum provided by fulcrum blocks 64 and first cam 70 on the first end of lever 60 will pivot upwardly as indicated by the arrow B in FIG. 12. Since first cam 70 on the first end of lever 60 is beneath the top of window 52 and bears against the upper thrust surface formed by the top of window 52 in collar 40, this pivoting motion in the direction of the arrow B will further force or raise collar 40 and tine 20 into a fully inserted position in tine holder 2. Essentially, lever 60 provides the user with enough leverage to fully raise collar 40 and tine 20 into place where collar 40 is very tightly compressed around tine 20, namely so tightly that tine 20 will be held in place during operation of the aerator and during the usual and normal forces encountered by tine 20 as it is driven into the ground and extracted therefrom. When collar 40 and tine 20 are fully inserted, window 52 in collar 40 will be generally vertically aligned with aperture 62 in tine holder 2.

Since lever 60 is needed to fully insert collar 40 and tine 20 into tine holder 2 with hand pressure being insufficient to do the job, it is apparent that some leverage must also be applied to do the reverse, namely to remove or uninstall collar 40 and tine 20 from tine holder 2. This removal operation will be illustrated in conjunction with FIGS. 13-15. These figures illustrate lever 60 being used to remove collar 40 holding the top eject tine 20c from tine holder 2. In FIG. 15, the middle side eject tine 20b is shown in its partially installed or inserted position prior to full insertion as shown in FIGS. 9-12. However, FIG. 15 shows the top eject tine 20c fully installed.

Figure 13:
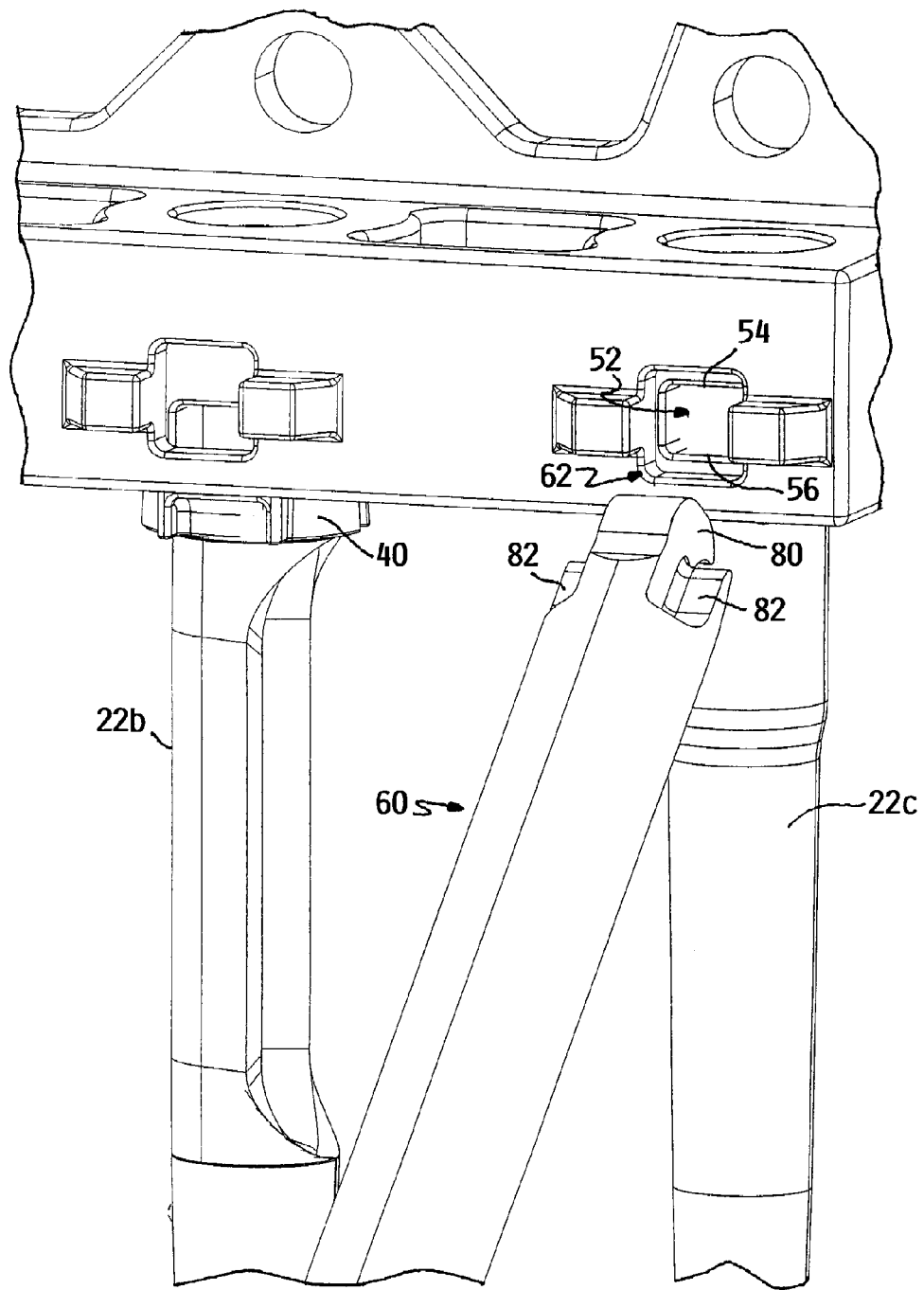
FIG. 13 is a perspective view of a portion of the front face of the tine holder of FIG. 1 with FIG. 13 being similar to FIG. 9, particularly illustrating the top eject tine in a fully inserted position in its bore in the tine holder and with the second end of the lever approaching the tine holder and the collar that carries the top eject tine.

Lever 60 also has a second end that is formed a bit differently than the first end. The second end of lever 60 also has a curved second cam 80, though one curved in a different manner than first cam 70 on the first end of lever 60, along with a pair of bearing surfaces 82 that will abut under fulcrum blocks 64 on tine holder 2 during a tine removal operation. FIG. 13 shows the second end of lever 60 approaching aperture 62 in tine holder 2 that is adjacent the top eject tine 20c. Note that since the top eject tine 20c is fully inserted into the corresponding bore in tine holder 2, aperture 62 in tine holder 2 is shown in FIG. 13 aligned with or overlying window 52 in collar 40.

Figure 14:
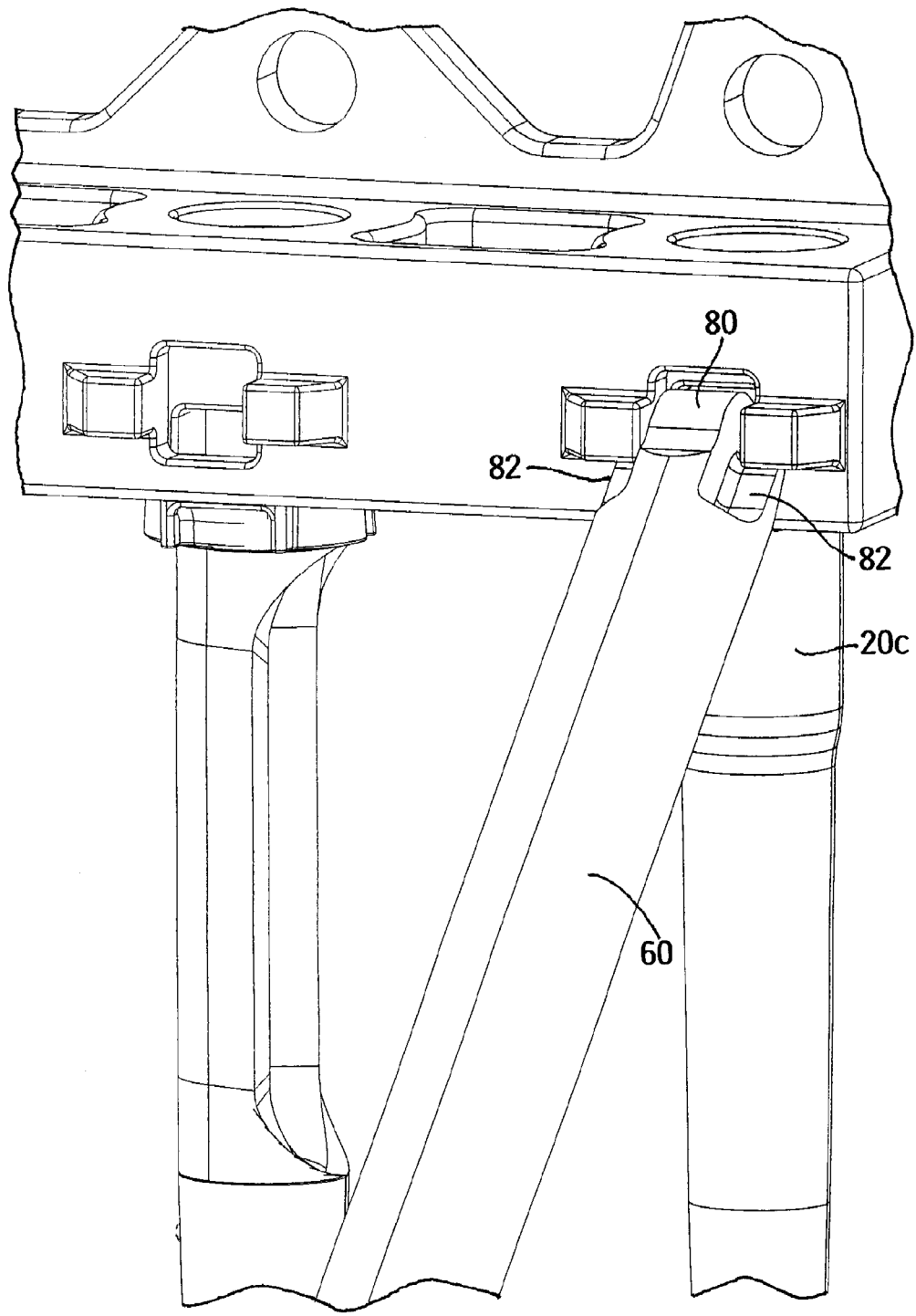
FIG. 14 is a perspective view similar to FIG. 13, particularly illustrating the second end of the lever fully engaged with the tine holder and the collar carrying the top eject tine.
Figure 15:
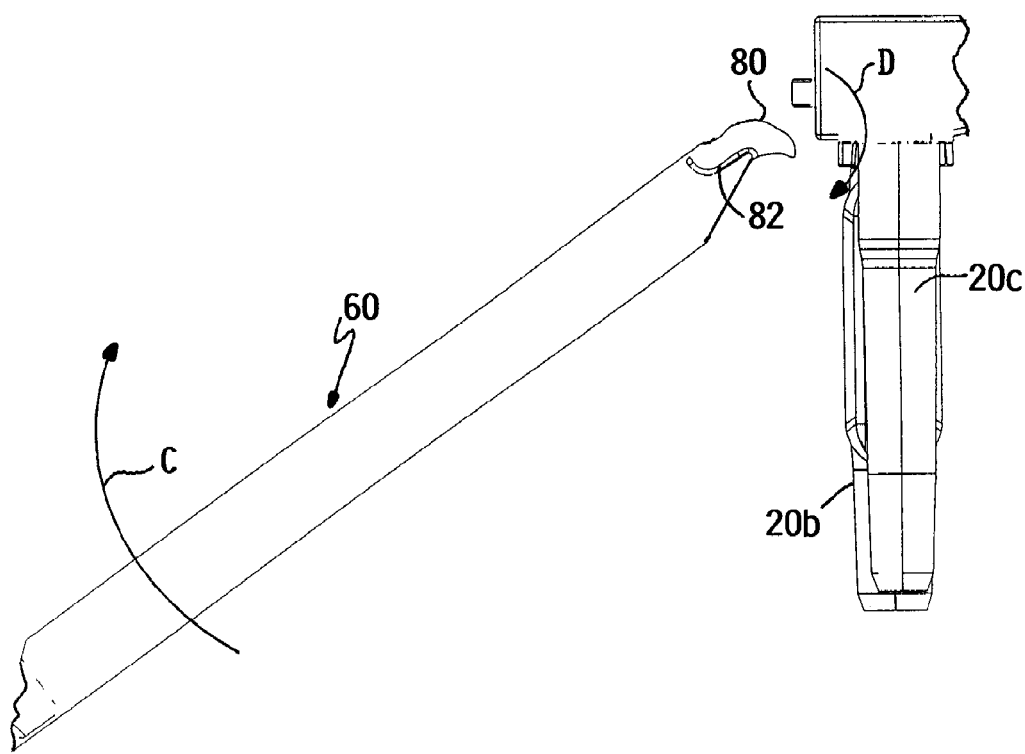
FIG. 15 is a side elevational view of the tine holder and the lever corresponding to the depiction in FIG. 12, particularly illustrating the curved tine removal cam on the second end of the lever and how the tine removal cam will pivot downwardly as the lever is rotated upwardly from the position shown in FIG. 15 about the fulcrum provided on the front face of the tine holder.
Figure 16:
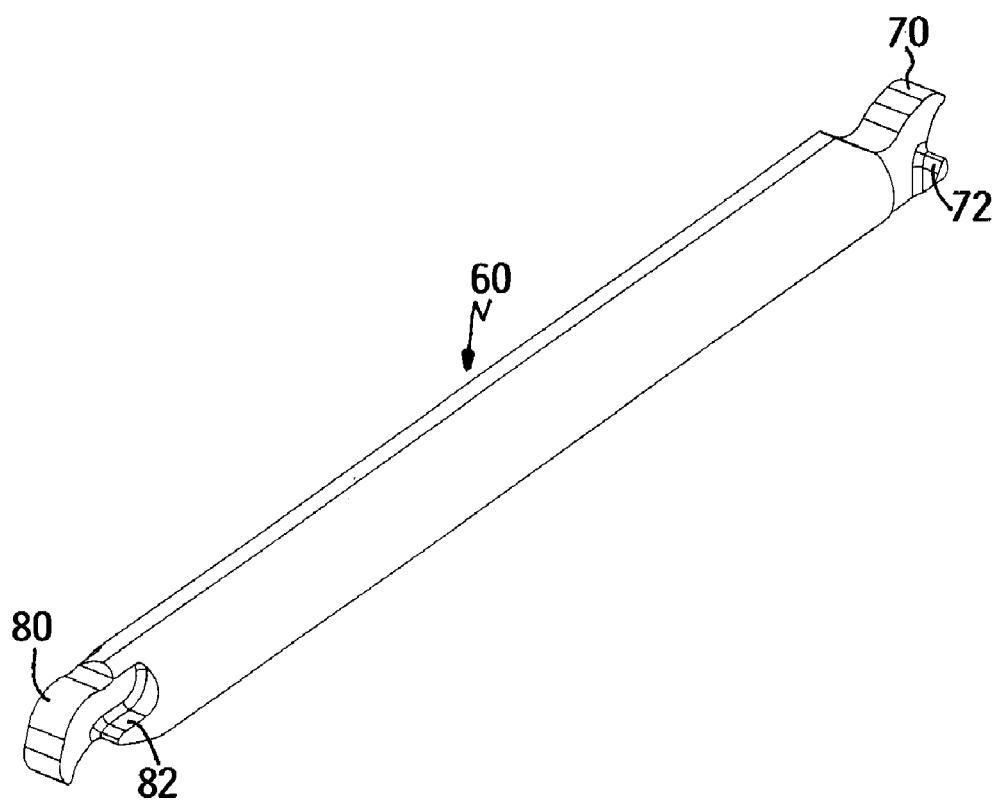
FIG. 16 is a perspective view of the lever used to finish installing or to begin removing a collar and the tine carried thereby from one of the bores of the tine holder.

FIG. 14 shows the second end of lever 60 engaged with tine holder 2. In this regard, second cam 80 on the second end of lever 60 has been inserted through aperture 62 in tine holder 2 and into window 52 in collar 40 that holds the top of the top eject tine 20c. Bearing surfaces 82 are engaged or jammed up against the underside of fulcrum blocks 64.

Referring to FIG. 15, when lever 60 is rotated upwardly as shown by the direction of the arrow C in FIG. 15, second cam 80 on the second end of lever 60 is rotated downwardly as shown by the arrow D in FIG. 15. This pushes downwardly on the lower thrust surface formed by the bottom 56 of window 52 in collar 40 to force or lever collar 40 and tine 20 carried thereby in a downward direction out of bore 26. The user can continue to use lever 60 to force collar 40 and tine 20 downwardly until collar 40 becomes sufficiently loose within bore 26 to permit collar 40 to be gripped and completely removed using hand pressure. Thus, the same tool that is used to install collar 40 and tine 20 in a bore in tine holder 2 is also used to remove collar 40 and tine 20 from a bore in tine holder 2.

Either end of lever 60 and either the first cam 70 or second cam 80 can be used for both a tine installation and tine removal operation. It is not necessary to use one end of lever 60 for the tine installation operation and the other end of lever 60 for the tine removal operation. In using the same end of lever 60 for both operations, lever 60 will be flipped over or inverted from one operation to the next since cams 70 or 80 point in opposite directions in the two operations and bearing surfaces 72 or 82 abut or engage on opposite sides of the fulcrum blocks 64. For example, in a tine removal operation, cams 70 or 80 will have the pointed nose thereof facing upwardly with bearing surfaces 72 or 82 resting on the top sides of fulcrum blocks 64. In a tine removal operation, the reverse is true—cams 70 or 80 will have the pointed nose thereof facing downwardly with bearing surfaces 72 or 82 engaging against the bottom sides of fulcrum blocks 64.

The reason for having two differently shaped cams 70 or 80 on opposite sides of lever 60 is to give the user some choice and flexibility in engaging lever 60 within collar 40 given the different relative positions in which different tine holders 2 come to rest when aerator 4 is not operating given the out of phase cyclic reciprocation of tine holders 2. Some tine holders 2 might be at or near top dead center, other tine holders 2 might be at or near bottom dead center, and yet other tine holders 2 might be somewhere in between top and bottom dead center. Tine holders 2 located at or near top dead center are harder to reach in at least one aerator 4 using tine holders 2 than the other tine holders 2. If the user needs to remove and replace a tine in one of the tine holders 2 at or near top dead center, the user might have to try first one end of lever 60, and then the other end of lever 60, and might also have to incline lever 60 upwardly, to find the end and orientation of lever 60 that works best in permitting lever 60 to properly engage collar 40 of the tine in question. For removing tines in other lower tine holders 2, i.e. those at bottom dead center or in intermediate positions, the opposite end of lever 60 and other orientations of lever 60 (such as an initially downwardly inclined orientation) might well work better.

Tine holder 2 of this invention permits the quick and easy installation or removal of an individual tine from tine holder 2 without requiring that tine holder 2 be disassembled to release tine 20 from some type of clamping engagement. This is an advantage because it speeds the replacement of an individual tine that might be bent or broken without the user having to unbolt various parts of tine holder 2 or unbolt any parts for that matter.

Moreover, the act of installing or removing any tine is quick and easy. To install, tine 20 is slipped into a collar, collar 40 and tine 20 are partially inserted into one bore 26 in tine holder 2 as far as hand pressure will permit, and then the first end of lever 60 is engaged with tine holder 2 and collar 40 and a simple downward pivoting motion on lever 60 will force collar 40 and tine 20 into their fully inserted position within bore 26. In this position, tine 20 is tightly gripped within compressible collar 40 and the gripping engagement will be sufficient to hold tine 20 in place during operation of the aerator.

The process of removing tine 20 is the reverse of that described above. In other words, the other end of lever 60 is engaged with tine holder 2 and collar 40 and lever 60 is pivoted upwardly to force collar 40 and tine 20 downwardly relative to bore 26. If desired, collar 40 and tine 20 can then be removed by hand after lever 60 has sufficiently loosened them within bore 26 or lever 60 could be used to completely force collar 40 out of bore 26. After removal tine 20 can simply be slipped out of collar 40. Thus, very little time and effort is needed either to install or remove a tine from tine holder 2.

Various modifications of this invention will be apparent to those skilled in the art. The presence of lands 44 and grooves 46 on collar 40 is preferred. They decrease the amount of force or leverage the user must apply to install or remove a tine 2. However, lands 44 and grooves 45 could be removed if so desired. Accordingly, this invention shall be limited only by the appended claims.

We claim:

1. A tine supporting apparatus for use with a turf aerator, the tine supporting apparatus being driven by the turf aerator in repeating cycles of up and down motion relative to the ground with a tine carried by the tine supporting apparatus being punched down into the ground during the down part of each cycle to form an aeration hole and with the tine carried by the tine supporting apparatus being withdrawn from the ground during the up part of each cycle, wherein the tine used with the tine supporting apparatus has an upper mounting section, which comprises:
   a) a tine holder having a substantially vertically extending bore;
   b) a compressible collar for receiving the upper mounting section of the tine, wherein the compressible collar has an uncompressed state in which the upper mounting section of the tine can be concentrically inserted into the collar and a fully compressed state in which the upper mounting section of the tine is sufficiently tightly gripped by the collar to prevent removal of the tine from the collar under the forces encountered by the tine and the collar during operation of the aerator;
   c) wherein the bore is shaped to compress the collar from the uncompressed state to the fully compressed state as the collar with the tine held therein is slid into the bore in a tine installation operation; and
   d) a pivotal lever that can be operatively engaged with both the tine holder and with the collar holding the tine for applying leverage to the collar to force the collar further into the bore to at least finish moving the collar to the fully compressed state within the bore to thereby complete the tine installation operation.

2. The tine supporting apparatus of claim 1, wherein the lever vertically pivots on the tine holder in moving the collar to the fully compressed state.

3. The tine supporting apparatus of claim 2, wherein the lever pivots around a fulcrum provided on a vertically extending, exterior face of the tine holder, wherein the lever is temporarily engaged with the fulcrum on the tine holder when applying leverage to the collar.

4. The tine supporting apparatus of claim 3, wherein the exterior face of the tine holder has a window permitting one end of the lever to protrude through the exterior face of the tine holder and to contact the collar for applying leverage to the collar.

5. The tine supporting apparatus of claim 4, wherein the collar has a window in a side thereof that is proximate to the exterior face of the tine holder when the collar is received in the bore, the window in the collar sliding progressively into registration with the window in the exterior face of the tine holder as the collar moves into the bore with the window in the collar straddling the window in the exterior face of the tine holder to expose one substantially horizontal thrust surface of the window in the collar inside the aperture in the tine holder.

6. The tine supporting apparatus of claim 5, wherein the one end of the lever has a curved cam that fits into the window in the collar and bears against the exposed horizontal thrust surface of the window in the collar to push against the collar when the lever is pivoted on the tine holder to move the collar further into the bore to reach the fully compressed state of the collar.

7. The tine supporting apparatus of claim 6, wherein the lever has an opposite end with a differently curved cam, wherein the differently curved cam bears against an exposed second horizontal thrust surface of the window in the collar when the collar is in its fully compressed state within the bore, wherein the differently curved cam on the opposite end of the lever applies leverage to the collar in a direction tending to slide the collar out of the bore when the lever is pivoted in a direction opposite to the direction used to install the collar in the bore.

8. The tine supporting apparatus of claim 1, wherein the bore in the tine holder and the collar have truncated, conical shapes that decrease in diameter in a vertically upward direction such that a top of the bore and a top of the collar are narrower than a bottom of the bore and a bottom of the collar, and wherein the bottom of the bore has an open bottom mouth with the collar being inserted into the bore in the uncompressed state thereof through the open bottom mouth of the bore.

9. The tine supporting apparatus of claim 8, wherein the collar is slid vertically upwardly within the bore to move from its uncompressed state to its fully compressed state, and wherein the lever pushes upwardly on the collar to finish moving the collar to the fully compressed state.

10. The tine supporting apparatus of claim 9, wherein the lever pivots downwardly relative to the tine holder to push upwardly on the collar.

11. The tine supporting apparatus of claim 10, wherein the lever abuts against a fulcrum provided on the tine holder with the fulcrum providing a pivot for the lever.

12. The tine supporting apparatus of claim 1, wherein the shape of the bore relative to the collar permits the collar to be inserted by hand into the bore and to slide the collar using hand pressure to an intermediate partially compressed state but with such hand pressure being insufficient to slide the collar from the partially compressed state to the fully compressed state, wherein the lever is the used to finish moving the collar from the partially compressed state to the fully compressed state thereof.

13. The tine supporting apparatus of claim 1, wherein the tine holder has a plurality of bores and a plurality of collars for holding a plurality of tines in the tine holder.

14. The tine supporting apparatus of claim 13, wherein a single lever that is detachable from the tine holder is used to individually move one by one the plurality of collars holding the plurality of tines to their fully compressed states.

15. The tine supporting apparatus of claim 1, wherein the collar is split along one side thereof.

16. The tine supporting apparatus of claim 15, wherein the collar is at least partially fluted along its periphery with a plurality of lands separated by grooves, the lands comprising thicker wall portions of the collar and the grooves comprising thinner wall portions of the collar.

17. The tine supporting apparatus of claim 16, wherein the lands have inside surfaces that define a substantially cylindrical surface having an inner diameter, the inner diameter of the substantially cylindrical surface contracting as the collar is compressed and expanding as the collar is uncompressed, wherein the upper mounting section of the tine comprises a substantially cylindrical section of the tine having an outer diameter, and wherein the inner diameter of the substantially cylindrical surface defined by the lands is slightly larger when the collar is uncompressed than the outer diameter of the cylindrical mounting section of the tine to allow the cylindrical mounting section of the tine to be inserted into the collar.

18. The tine supporting apparatus of claim 17, wherein the lands have outside surfaces that form a generally conical, truncated shape for an exterior of the collar.

19. A tine supporting apparatus for use with a turf aerator, the tine supporting apparatus being driven by the turf aerator in repeating cycles of up and down motion relative to the ground with a plurality of tines carried by the tine supporting apparatus being punched down into the ground during the down part of each cycle to form an aeration hole and with the tines carried by the tine supporting apparatus being withdrawn from the ground during the up part of each cycle, wherein each tine used with the tine holder has an upper mounting section, which comprises:
   a) a tine holder having a plurality of spaced vertical bores therein for holding the plurality of tines in a generally upright, spaced side-by-side manner;
   b) a plurality of radially compressible members corresponding in number to the numbers of bores with one compressible member being provided for each bore, wherein the compressible members radially expand when the compressible members are uncompressed and radially contract when the compressible members are compressed, wherein each compressible member when uncompressed is radially large enough to allow the upper mounting section of the tine to be inserted concentrically within the compressible member, and wherein each compressible member when compressed is radially small enough to allow the upper mounting section of the tine to be tightly gripped within the compressible member and to avoid coming out of the compressible member during operation of the aerator; and
   c) wherein each compressible member can be compressed and uncompressed separately from the other compressible members in the tine holder to allow an individual tine to be removed from and replaced in the tine holder without affecting the gripping force provided by the other compressible members on the other tines.

20. The tine supporting apparatus of claim 19, wherein the radially compressible members comprise split collars each having a generally cylindrical inner diameter and a truncated, conical exterior.

21. A tine supporting apparatus for holding a plurality of aerator tines, which comprises:
   a) a tine holder having a plurality of substantially vertical, tapered bores;
   b) a plurality of tapered collars with one collar adapted to be received in each bore, wherein each collar is split so that the collar contracts as the collar is slid into the corresponding bore, wherein the upper end of an aerator tine is inserted into each collar such that the contraction of the collar as the collar is slid into the bore will suffice to tightly grip and hold each tine in the tine holder; and
   c) a tool for providing enough leverage on the collar to physically slide each collar in a first direction over final portions of its movement as the collar slides into the bore during tine installation and to physically slide each collar in a second opposed direction over beginning portions of its movement as the collar slides out of the bore during tine removal.

22. The tine supporting apparatus of claim 21, wherein the tool acts on one collar at a time.

* * * * *